United States Patent
Barnett

[11] Patent Number: 5,911,838
[45] Date of Patent: *Jun. 15, 1999

[54] LEAD PAINT REMOVAL

[76] Inventor: Irvin Barnett, 15686 Via Calanova, San Diego, Calif. 92128

[*] Notice: This patent is subject to a terminal disclaimer.

[21] Appl. No.: 08/933,179

[22] Filed: Sep. 18, 1997

Related U.S. Application Data

[60] Continuation-in-part of application No. 08/745,323, Oct. 15, 1996, which is a division of application No. 08/151,952, Nov. 15, 1993, Pat. No. 5,597,787.

[51] Int. Cl.$^6$ .................... B08B 7/00; C09D 9/00
[52] U.S. Cl. .................... 134/38; 134/4; 134/29; 134/42; 510/203; 510/207; 510/212; 510/434; 510/435; 510/476; 510/506; 510/507
[58] Field of Search .................... 134/4, 29, 38, 134/42; 510/203, 207, 212, 434, 435, 476, 506, 507

[56] References Cited

U.S. PATENT DOCUMENTS

| | | | |
|---|---|---|---|
| 2,447,052 | 8/1948 | Bond et al. | 252/DIG. 8 |
| 4,368,082 | 1/1983 | Poels | 134/4 |
| 4,502,891 | 3/1985 | Brocklehurst et al. | 134/4 |
| 4,652,393 | 3/1987 | Ely et al. | 134/4 X |
| 4,692,263 | 9/1987 | Eberhardt et al. | 134/38 X |
| 4,699,730 | 10/1987 | Miles et al. | 134/38 X |
| 5,167,853 | 12/1992 | Stevens | 134/38 X |
| 5,597,787 | 1/1997 | Barnett | 510/203 |

*Primary Examiner*—Arlen Soderquist
*Attorney, Agent, or Firm*—Ernest D. Buff

[57] ABSTRACT

Oil-based paint containing lead compounds, acrylic-based or other latex paint or a combination of paints in which acrylic-based or other latex paint covers an oil-based paint is removed from a substrate on which the paint is deposited by application of an aqueous solution thereto. The solution comprises a solvent that does not dissolve the oil-based paint and is compatible with water; a film former for retarding evaporation; a viscosity builder to fortify the solution and prevent slumping thereof during application to vertical and overhead horizontal surfaces; an alkaline compound for reacting with the pigment portion of the paint. Advantageously, the solution penetrates the deposited paint, which coagulates and separates from the substrate. Stripping procedures are facilitated, and neutralization of the substrate prior to repainting is avoided. A safe and effective treatment of materials covered with lead-containing paint is carried out in an economical, cost efficient manner.

5 Claims, No Drawings

LEAD PAINT REMOVAL

CROSS-REFERENCE TO RELATED APPLICATIONS

This is a continuation-in-part of application Ser. No. 08/745,323, filed Oct. 15, 1996, which, in turn, is a Divisional of application Ser. No. 08/151,952, filed Nov. 15, 1993 now U.S. Pat. No. 5,597,787.

BACKGROUND OF THE INVENTION

1. Field of the Invention

This invention relates to the treatment of materials that have been painted with lead-based paint to effect the removal of the paint in a safe and economical manner.

2. Description of the Prior Art

It has been established that paint containing lead compounds presents a health hazard, and its use in the United States has been banned since about 1978. Nevertheless much untreated lead paint is still in place; its removal is highly advisable and, in many installations, mandated by law. The reason for requiring removal of paint containing lead is that continued aging thereof causes it to flake and dust, increasing the potential for lead poisoning from inhalation.

There are presently available two methods for removing or stripping paint. One is physical and the other chemical. The physical method involves either sandblasting or destruction of the paint using heat from a blow-torch or hot air blower having an output temperature up to 1200° F. This method is expected to be banned by the EPA shortly.

The chemical method involves two distinct classes of products and procedures. The most common products are those that contain an assortment of organic solvents, such as methylene chloride, toluene, acetone and various alcohols, that soften and/or dissolve whatever paint vehicle is encountered. Such products have been marketed for years. A number of these solvents are believed to be hazardous, having exhibited toxic and carcinogenic effects. Many of them have technical and economical disadvantages. The high volatility of these solvents severely restricts the time period allotted for removal of softened or dissolved paint, which rehardens shortly after application of the remover. Costs involved in removal and disposal of the tacky material produced by the solvents is relatively high. Solvent-type removers are restricted by seasonal and geographical conditions. Application of such removers outdoors in hot weather (above about 85° F.), or in direct sunlight has been unsuccessful. Even though these products are said to include a film-former, the temperature of the painted substrate cannot exceed 100° F. Above that temperature, the majority of solvent volatilizes prior to film formation, rendering the product ineffective.

A recently introduced line of products for chemically removing paint contain no organic solvents. These products are comprised principally of a combination of caustic compounds, such as calcium hydroxide, magnesium hydroxide, and sodium hydroxide. Such compounds are in a water base and generally form a paste. These products are applied to the painted material, and then allowed to dry for time periods as high as 48 hours. It is recommended by products of this type that the applied coating be covered with a polyethylene sheeting to retard drying and increase activity time. After drying is completed, a crusty residue, formed during drying, is scraped off laboriously. Thereafter, the substrate must be neutralized with an acid using precautionary procedures to prevent run-off from entering ground waters.

Problems attending the use of chemical or physical methods for removing oil-based, lead containing paints have led to use of modern paints and coatings which cover the oil-based, lead containing paints, thereby delaying the costly, removal thereof. Oil-based paints containing polyurethane, epoxy or alkyd resins, as well as latex paint, have been used for this purpose. The result of this approach is a composite paint system which must ultimately be removed to satisfy enviromental safety standards.

There remains a need in the art for a method wherein composite paint systems can be readily removed in a safe, economical manner using a single, low-cost formulation.

SUMMARY OF THE INVENTION

The present invention provides a method whereby materials covered with (i) oil-based paint, especially paint containing lead compounds, (ii) acrylic-based or other latex paint or (iii) a combination of paints in which an acrylic-based or other latex paint covers an oil-based paint are treated with an aqueous solution to effect the removal of the paint. In addition, the invention provides a composition for use with such method to effect removal of oil based paint in a safe, economical manner. Further, there is provided a method for removing composite paint systems in a safe, economical manner using a single, low-cost formulation.

Specifically, the present invention provides an aqueous solution for treating materials, such as wood, metal, masonry, brick, and composition board, which have been covered with lead based and/or latex paint, to remove the paint therefrom. Briefly stated, the solution comprises a solvent that does not dissolve the oil-based paint and is compatible with water, the solvent being present in an amount ranging from about 15 to 80% by weight of the solution; a film former for retarding evaporation, the film former being present in amount less than 12% by weight of the solution; a viscosity builder to prevent slumping during application of the solution to vertical and overhead horizontal surfaces, the viscosity builder being present in an amount ranging from about 6 to 40% by weight of the solution; and an alkaline compound for reacting with pigment containing portions of the paint to loosen any crusted lead compounds, or other pigments, present on the surface thereof, the alkaline compound being present in an amount ranging from about 0.25 to 3.7% by weight of the solution. Such crusted lead compounds oftentimes remain on the surface of aged paint following erosion of the original vehicle by oxidation and weathering.

In addition, the invention provides a method for safely and economically removing lead based paint covering a substrate, comprising the steps of: (a) applying to the substrate an aqueous solution as defined hereinabove; (b) allowing the applied solution to dry, and thereby maximize utilization of solvent activity available; and (c) rewetting the covering with water to coagulate substantially the entire resin content of the paint and remove it from the substrate.

Advantageously, the solution penetrates the deposited paint, which coagulates and separates from the substrate. This "penetrating action" is effective for each of the oil-based and acrylic-based or other latex paints. It is particularly advantageous for removal of combinations of paint wherein an oil-based paint is covered by an acrylic-based paint. Costly stripping procedures are eliminated. Substrates from which lead and/or acrylic-based paint has been removed in accordance with the invention do not require neutralization prior to repainting. A safe and effective treatment of materials covered with lead based paint or composite paint systems is thereby carried out in an economical, cost effective manner.

DESCRIPTION OF THE PREFERRED EMBODIMENTS

The present invention provides a method for safely and economically removing lead-based paint or composite paint systems comprising acrylic-based and oil-based paint from a substrate. Generally stated, the method comprises the steps of: (a) applying to the paint covered substrate an aqueous solution consisting essentially of (1) a low volatile, water compatible solvent that does not dissolve the oil-based paint, the solvent being present in an amount ranging from about 15 to 80% by weight of the solution, (2) a thermoplastic resin for film formation to retard evaporation, the film former being present in amount less than 12% by weight of the solution, (3) a viscosity builder composed of plastic clay to increase viscosity, the viscosity builder being present in an amount ranging from about 6 to 40% by weight of the solution, and (4) an alkaline compound to react with crusted pigments, which are oftentimes present on the surface of aged and weathered painted material, the alkaline compound being present in an amount ranging from about 0.25 to 3.7% by weight of the solution; (b) allowing the solution to dry to complete the reaction and thereby maximize utilization of solvent activity available and (c) rewetting the resultant structure with water to coagulate substantially the entire resin content of the structure, and to soften and facilitate its removal from the substrate for eventual disposal.

It has been discovered that problems heretofore encountered with solvents conventionally used in paint removers are overcome by use of a low volatile, relatively safe solvent, together with additional ingredients, as described hereinafter. One such solvent is known to be a coalescent or solvent in acrylic latex paint, but is not known to be a solvent for the vehicles used in oil-based paints. That solvent is ethylene glycol monobutyl ether (butyl cellosolve).

More specifically, the solvent can be any glycol ether that is (i) completely soluble in water, (ii) does not dissolve oil based paint and (iii) does dissolve latex paint. For this purpose, 2-Butoxyethanol (ethylene glycol monobutyl ether) is preferred, but other more volatile and less volatile compounds of the type described in the following examples, including diethylene glycol monobutyl ether, ethylene glycol ethyl ether, propylene glycol methyl ether, and the like, can also be used. The content of the solvent typically ranges from about 15 to 80 percent by weight of the total content of paint remover composition.

In laboratory experiments in which a wood substrate containing lead paint was placed face up in a horizontal plane, it was observed that, unexpectedly, a puddle of the selected solvent was slowly absorbed. Upon repeated applications of the solvent over a period of several hours, the layers of paint, surprisingly, began to blister and permanently separate from the substrate. However, at no time did the paint itself appear to be dissolving, or become tacky. It has further been discovered that use of this solvent alone is impractical, since sufficient quantities of it must remain at the "scene of action" long enough to perform its function. Also, since most of the applied paint is found on materials in the vertical plane and overhead, it would be difficult to maintain sufficient quantities of the solvent on the paint covered substrate to readily separate the paint therefrom unless the viscosity thereof is increased substantially. Such an increase in viscosity is provided by (1) a rapid film former, which traps and delays evaporation of the solvent and (2) a viscosity builder, which minimizes slumping or running of the solution off the paint covered surface of the substrate.

The film former can be an acrylic resin polymer emulsion introduced in small quantities into the solvent. Specifically, the film former is a thermoplastic resin capable of being dissolved by water-soluble glycol ethers. The preferred film former is an all-acrylic polymer, or copolymer, in emulsion form at 50% solids, and comprising less than 12% by weight of total composition. The resin operates to retard evaporation of the liquid content. If more than about 12% resin emulsion is included, the dried film starts to resist rewetting with water, thus adversely affecting hydro/pneumatic take-off of destroyed paint structures, normally desired in commercial abatement of paint.

Various ratios of resin to solvent can be used. Generally, as the resin content increases, so does the desirable properties of film formation and increased viscosity. It has been found that with increased viscosity there was also an increase in "stringiness" that makes it difficult to apply the solution to a painted surface with brush or sprayer. To prevent having to compromise the ratio of resin to solvent, an additional increase in viscosity, without an increase in "stringiness", is needed.

That further increase in viscosity is provided by a clay containing a substantial amount of montmorrillonite mineral. Such clay is also known as Wyoming bentonite, the principal mineral content of which is expressed by the formula $Al_2O_3 \bullet 4SiO_2 \bullet H_2O$. This clay is generally used where a plastic clay is needed, or to increase viscosity in emulsions. The latter is achieved by the swelling action upon absorption of water. Wyoming bentonite is an economical viscosity builder, since the majority content thereof is a colloidal clay. In addition, it dries into a pseudo film which fortifies the film developed by the acrylic resin polymer. Although formulations comprised strictly of the solvent, resin, and clay have physical properties for practical application and chemical properties for removal of lead paint manufactured in 1973 (but applied in 1993) to wood, metal and masonry substrates, it is not completely effective on aged and exposed paint that has been applied from 5–30 years ago.

More specifically, the viscosity builder can be any natural clay with plastic characteristics. The preferred viscosity builder is bentonite containing a substantial amount of montmorrillonite material. Its content typically ranges from about 6% to about 40% by weight of the total composition, depending upon the desired viscosity thereof. Higher amounts of viscosity builder favor application by hand implements, while lower amounts are best suited for spray application, or for use where heavy build-up of paint remover is not required.

Examination of substrates that have been painted with lead paint at least 15 years ago, and have been exposed to the attrition of weather reveals the erosion of substantial content of the original vehicle (binder). This leaves the surface layers of the paint with a high content of crusted pigment material consisting of lead and other compounds containing chromates, carbonates, oxides, and hydroxides. To effect removal of paint under these conditions, it is necessary to elevate the pH of the solution with dilute sodium hydroxide solution.

More specifically, $Na(^+)$ and $OH(^-)$ ions greatly influence the viscosity of clays, especially bentonite, by controlling flocculation and deflocculation. Certain paint removal applications require maximum deflocculation of the clay and more effective attack of old paint structures which contain minimum vehicle (binder) and maximum pigment content. For those applications, sodium or potassium compounds, preferably hydroxides, are included in amounts ranging from about 0.25% to 3.7% by weight of the total content of ingredients. In greater amounts, the $Na(^+)$ or $K(^-)$ tends to coagulate the clay content rather than continue to defloculate and swell the clay. This coagulation operates to reduce the viscosity, making it difficult to build up sufficient thickness of composition on vertical planes prior to slumping.

The inclusion of water is essential to the paint removal formulation of this invention. Water serves several requirements. It causes deflocculation of the plastic clay and keeps the alkali compounds in solution. In compositions used in certain locations, for example, where the volatile organic content (V.O.C.) is limited to a maximum of 400 gm/liter, it serves as a diluent in the product composition. In such situations, the water, as diluent, reduces the potency of the product, but not the eventual effectiveness thereof.

The ranges of ingredients of the aqueous solution were arrived at by investigating many formulations in which the content of the solvent (butyl cellosolve) and acrylic resin emulsion remained constant, and the content of the bentonite and sodium hydroxide solution were varied.

The following examples are presented to provide a more complete understanding of the invention. The specific techniques, conditions, materials and reported data set forth to illustrate the principles and practice of the invention are exemplary and should not be construed as limiting the scope of the invention.

EXAMPLE I

A formulation was prepared which contained the following ingredients:

220.00 Fl. oz. ethylene glycol monobutyl ether (butyl cellosolve);

43.30 Fl. oz. acrylic emulsion (Rohm & Haas Co. Rhoplex AC 630);

70.00 Fl. oz. 10% sodium hydroxide solution; and 4.63 lb. bentonite (Wyoming Big Horn 325 mesh).

The ingredients of the formulation were introduced in the sequence listed above and thoroughly mixed.

After mixing, the formulation was applied by brush to a steel substrate that had been painted with 8 coats of lead based paint. The lead based paint had been manufactured in 1973, and had the following composition:

| Pigment by weight | | 29% |
|---|---|---|
| Lead Chromate | 29% | |
| Vehicle by weight | | 71% |
| Soya Alkyd Resin | 24% | |
| Tall Oil Alkyd Resin | 5% | |
| Mineral Spirits | 37% | |
| Naphtha | | |
| Additives | 2% | |
| | 100% | 100% |

Prior to applying the paint removal formulation, the painted substrate was thoroughly air-dried and then baked for 2 hours at 1 80° F.

The amount of remover for a particular painted substrate will vary, depending upon the thickness of the paint and the condition thereof on the substrate. In the test conducted herein, the removal formulation was applied until slumping commenced when the test sample was placed in a vertical plane. After about 3 hours, the combination of remover and paint began to blister and separate from the substrate. At this point, the entire paint structure could be readily removed. To maximize efficiency of removal and disposal, the sample was allowed to dry for 12 hours. After drying, all activity of the remover had been utilized, and the material appointed for removal was no longer tacky.

Unlike solvent-based removers which, upon drying, form a combination film that can only be dissolved with solvents, the product of my invention forms a film that, upon drying, can be reversed with plain water. This is so because the influential ingredient in the film forming is the bentonite which, being hygroscopic, forms a completely reversible film. Accordingly, removal of the dried, separated paint from the substrate was readily accomplished by application of water, using a sprayer, until the structure softened. The application of the water performed two functions. First, it reactivated the dried structure, causing it to again separate from the substrate. Secondly, since the original resin emulsion used in the formulation had been broken by the drying, the re-introduction of plain water caused the resin polymer to coagulate. This coagulation feature is highly desirable, particularly at this point of the process, because it eliminates tackiness and facilitates the removal of the composite paint structure for subsequent disposal.

EXAMPLE II

The formulation of Example I was applied to a soft wood substrate that had been painted with the same paint, the same number of coats, and dried in the same manner as the metal substrate described in Example I.

Unlike the metal substrate, the test on the wood produced very little blistering of the paint. It was concluded that, after passing through the paint, a liquid composed of the residual solvent and water was absorbed by the wood. In the case of the metal substrate, this liquid apparently pocketed, and lifted the paint on its return to surface evaporation. Under these conditions, the paint did not separate as easily from the porous wood as it did from the metal, but the removal was very effective after following the procedure described in Example I.

EXAMPLE III

A field test was made on cypress wood windows that had been painted with many coats of lead paint over a 50 year period, and presented severely weathered surface layers. The formulation and procedure described in Example I were employed in bright sunlight at a temperature ranging from 95 to 100 F. Due to the low volatility and effective film formation, the applied remover required over 4 hours to dry. After drying and rewetting with water, the paint was removed with a single application of remover. During the same time frame and at the same location over 15 different commercial solvent-based removers were tried on the substrates described in this Example, and in Examples IV and V, described hereinafter, and were found to be ineffective. One reason for ineffectiveness of the commercial solvent-based removers was the high volatility thereof. This caused the rapid evaporation of ingredients and decreased activity of the products upon application to the hot substrates. In some cases, the removers would soften only one layer of paint at a time for removal. In each case, the procedure had to be repeated many times to reach the bare substrates. It was apparent that practice of this method using commercial removers would entail high material and labor costs.

EXAMPLE IV

A field test was carried out on metal gutters. The location of the test, the formulation and procedure employed, and the time frame for removal of the paint were the same as those recited in Example III. In this case, there was blistering of the paint that made its removal easier than from the wood windows.

EXAMPLE V

A field test was carried out on a cement block wall. The location of the test, the formulation and procedure employed, and the time frame for removal of the paint were the same as those recited in Example III. After removing the bulk of the separated paint, a wire brush was used to complete the stripping of the paint from the indentations and pores of the substrate.

EXAMPLE VI

A formulation was prepared which contained the following ingredients:

| Ingredient | Amount (% Wt/Wt) |
| --- | --- |
| 2-butoxyethanol | 50 |
| 10% potassium hydroxide solution | 19 |
| Acrylic emulsion (50% solids) | 12 |
| Bentonite clay | 19 |
| Total | 100 |

The ingredients of the formulation were introduced in the sequence listed above and thoroughly mixed.

After mixing, the formulation was applied by brush to a wood substrate that had been painted with 4 coats of lead based alkyd paint. After 4 hours, the paint was readily removed by high pressure water wash at about 1800 PSI and 3 gal/min.

EXAMPLE VII

A formulation was prepared which contained the following ingredients:

| Ingredient | Amount (% Wt/Wt) |
| --- | --- |
| Diethylene glycol monobutyl ether | 43 |
| 10% sodium hydroxide solution | 27 |
| Acrylic emulsion (50% solids) | 6 |
| Bentonite clay | 24 |
| Total | 100 |

The ingredients of the formulation were introduced in the sequence listed above and thoroughly mixed.

After mixing, the formulation was applied by brush to a metal substrate that had been painted with 4 coats of an alkyd paint. The paint retained tackiness for several days after application and was ultimately removed without difficulty. This formulation was considered acceptable for domestic use, but would not be amenable to water/air take off procedures, such as power washing, which procedure is ideally suited for use by contractors.

EXAMPLE VIII

A formulation was prepared which contained the following ingredients:

| Ingredient | Amount (% Wt/Wt) |
| --- | --- |
| Ethylene glycol ethyl ether | 43 |
| 10% sodium hydroxide solution | 27 |
| Acrylic emulsion (50% solids) | 6 |
| Bentonite clay | 24 |
| Total | 100 |

The ingredients of the formulation were introduced in the sequence listed above and thoroughly mixed.

After mixing, the formulation was applied by brush to a metal substrate that had been painted with 4 coats of a lead-based alkyd paint. The paint removing function of this composition was acceptable; but it is not a strong candidate for commercial applications, owing to its high volatility and low flash point.

EXAMPLE XIV

A formulation was prepared which contained the following ingredients:

| Ingredient | Amount (% Wt/Wt) |
| --- | --- |
| Propylene glycol methyl ether | 40 |
| 10% sodium hydroxide solution | 29 |
| Acrylic emulsion (50% solids) | 6 |
| Bentonite clay | 25 |
| Total | 100 |

The ingredients of the formulation were introduced in the sequence listed above and thoroughly mixed.

After mixing, the formulation was applied by to a metal substrate that had been painted with 4 coats of an alkyd paint. Application of the formulation was carried out at a wet thickness of about 60 mils. The paint removing function of this composition was successful; but it exhibited higher volatility than 2-butoxethanol (11 times the evaporation rate) and lower flash point. As a result, the acceptance of this formulation for commercial use in paint removers may be somewhat limited.

In localities that strictly monitor environment, the solvent employed in this Example would be highly recommended, since it is presently exempt as a "Hazardous Air Pollutant" under the 1990 Clean Air Act Amendments and the Superfund Amendments and Reauthorization Act (SARA), Title III, Section 313.

EXAMPLE XV

A formulation was prepared which contained the following ingredients:

| Ingredient | Amount (% Wt/Wt) |
| --- | --- |
| 2-Butoxyethanol | 38 |
| Sodium hydroxide solution (50% solids) | 7 |
| Acrylic emulsion (50% solids) | 5 |

-continued

| Ingredient | Amount (% Wt/Wt) |
|---|---|
| Bentonite clay | 24 |
| Water | 26 |
| Total | 100 |

The ingredients of the formulation were introduced in the sequence listed above and thoroughly mixed.

After mixing, the formulation was applied by to a steel substrate that had been painted with multiple coats of a lead-based paint. The composition was effective in removing the paint from the substrate.

EXAMPLE XVI

A formulation was prepared which contained the following ingredients:

| Ingredient | Amount (% Wt/Wt) |
|---|---|
| 2-Butoxyethanol | 38.0 |
| Sodium hydroxide solution (50% solids) | 0.5 |
| Acrylic emulsion (50% solids) | 7.5 |
| Bentonite clay | 11.0 |
| Water | 43.0 |
| Total | 100.0 |

The ingredients of the formulation were introduced in the sequence listed above and thoroughly mixed.

After mixing, the formulation was applied by to a metal substrate that had been painted with epoxy enamel primer and 2 coats of polyurethane enamel, with a total paint thickness of about 6 mils. The paint removing function of this composition was successful.

EXAMPLE XVII

A formulation was prepared which contained the following ingredients:

| Ingredient | Amount (% Wt/Wt) |
|---|---|
| 2-Butoxyethanol | 15.0 |
| 10% sodium hydroxide solution | 0.5 |
| Acrylic emulsion (50% solids) | 2.0 |
| Bentonite clay | 15.0 |
| Water | 67.5 |
| Total: | 100.0 |

The ingredients of the formulation were introduced in the sequence listed above and thoroughly mixed.

After mixing, the formulation was applied by to a metal substrate that had been sprayed with an oil-based paint. The formulation was very effective in lifting the paint in less than one hour dwell time. Final rinsing was carried out with a power washer. This formulation is effective in removing paint applied from a spray-can, such as graffiti, from metal or wooden substrates.

Having thus described the invention in rather full detail, it will be understood that such detail need not be strictly adhered to, but that further changes may suggest themselves to one having ordinary skill in the art, all falling within the scope of the invention as defined by the subjoined claims.

What is claimed is:
1. An aqueous solution for the removal of paints having a latex base or an oil-base, including those containing lead compounds, from a substrate, comprising:
 a) a solvent that is a glycol ether which (i) is completely soluble in water, (ii) does not dissolve oil based paint and (iii) does dissolve latex paint, said solvent being present in an amount ranging from about 15 to 80% by weight of said solution;
 b) a film former for retarding evaporation, said film former being a thermoplastic resin comprising an all-acrylic polymer, or copolymer, in emulsion form, and being present in an amount less than 12% by weight of said solution;
 c) a viscosity builder to fortify said solution and prevent slumping thereof during application to vertical and overhead horizontal surfaces, said viscosity builder being a plastic clav present in an amount ranging from about 6 to 40% by weight of said solution; and
 d) an alkaline compound for reacting with the pigment portion of said paint, said alkaline compound being sodium hydroxide or potassium hydroxide and being present in an amount ranging from about 0.25 to 3.7% by weight of said solution, whereby said solution penetrates said paint and causes its separation from said substrate.

2. An aqueous solution as recited by claim 1, wherein said solvent is ethylene glycol monobutyl ether.

3. An aqueous solution as recited by claim 1, wherein said clay is a bentonite containing a substantial amount of montmorrillonite material.

4. An aqueous solution as recited by claim 1, wherein said solvent is selected from the group consisting of ethylene glycol monobutyl ether, diethylene glycol monobutyl ether, ethylene glycol ethyl ether, and propylene glycol methyl ether.

5. A method for removing oil-based and/or latex based paints covering a substrate, comprising the steps of:
 a) applying to said paint covered substrate an aqueous solution having a composition comprising:
  (1) a solvent that is a glycol ether which (i) is completely soluble in water, (ii) does not dissolve oil based paint and (iii) does dissolve latex paint said solvent being present in an amount ranging from about 15 to 80% by weight of said solution;
  (2) a film former for retarding evaporation, said film former being a thermoplastic resin comprising an all-acrvlic polymer, or copolymer, in emulsion form, and being present in amount less than 12% by weight of said solution;
  (3) a viscosity builder to fortify said solution and prevent slumping thereof during application to vertical and overhead horizontal surfaces, said viscosity builder being a plastic clay present in an amount ranging from about 6 to 40% by weight of said solution;
  (4) an alkaline compound for reacting with the pigment portion of said paint, said alkaline compound being sodium hydroxide or potassium hydroxide and being present in an amount ranging from about 0.25 to 3.7% by weight of said solution;
 b) allowing the applied solution to dry to thereby maximize utilization of solvent activity available; and
 c) rewetting said covering with water to coagulate substantially the entire resin content thereof and facilitate its removal from said substrate.

* * * * *